(12) United States Patent
Paulsen et al.

(10) Patent No.: US 10,625,550 B2
(45) Date of Patent: Apr. 21, 2020

(54) CONTROL ARM AND METHOD FOR PRODUCING A CONTROL ARM

(71) Applicant: Benteler Automobiltechnik GmbH, Paderborn (DE)

(72) Inventors: Frode Paulsen, Gjøvik (NO); Dirk Voigt, Altenbeken (DE); Guido Boeing, Büren (DE); Stephan Meyer, Bielefeld (DE)

(73) Assignee: BENTELER AUTOMOBILTECHNIK GmbH, Paderborn (DE)

( * ) Notice: Subject to any disclaimer, the term of this patent is extended or adjusted under 35 U.S.C. 154(b) by 29 days.

(21) Appl. No.: 16/050,690

(22) Filed: Jul. 31, 2018

(65) Prior Publication Data

US 2019/0092115 A1 Mar. 28, 2019

(30) Foreign Application Priority Data

Jul. 31, 2017 (DE) .......................... 10 2017 117 309

(51) Int. Cl.
*B60G 7/00* (2006.01)
*B23P 15/00* (2006.01)
*B21D 53/88* (2006.01)

(52) U.S. Cl.
CPC ............. *B60G 7/001* (2013.01); *B21D 53/88* (2013.01); *B23P 15/00* (2013.01); *B23P 2700/14* (2013.01); *B60G 2206/10* (2013.01); *B60G 2206/11* (2013.01); *B60G 2206/16* (2013.01);

(Continued)

(58) Field of Classification Search
CPC ...... B60G 7/001; B60G 7/00; B60G 2206/16; B60G 2206/11; B60G 2206/7102; B60G 2206/8105; B60G 2206/10; B60G 2206/0122; B60G 3/02; B60G 3/04;

(Continued)

(56) References Cited

U.S. PATENT DOCUMENTS 8,616,570 B2 * 12/2013 Mielke ................... B60G 7/001
                             280/124.134
2009/0072506 A1 * 3/2009 Jang ........................ B21C 23/12
                             280/124.134

(Continued)

FOREIGN PATENT DOCUMENTS

DE      197 37 715     3/1999
DE   102012020646 A1 * 4/2013 ................ B21J 5/00

(Continued)

*Primary Examiner* — Keith J Frisby
(74) *Attorney, Agent, or Firm* — Nixon & Vanderhye P.C.

(57) ABSTRACT

A control arm and a method of manufacturing thereof is disclosed. The control arm is made of an aluminum extrusion profile with a first end section, a second end section, and a middle section, which connects the first and second end sections. The control arm includes a base, two side walls, which are angled substantially perpendicular therefrom and which are spaced apart from one another on the longitudinal side, with a height H, and flanges, which are angled substantially perpendicular from the side walls at their free end. The first end section includes a first connecting region, the second end section includes a second connecting region, and the middle section includes at least one third connecting region.

14 Claims, 9 Drawing Sheets

(52) U.S. Cl.
CPC ............... *B60G 2206/7102* (2013.01); *B60G 2206/8105* (2013.01)

(58) Field of Classification Search
CPC ........ B60G 3/06; B23P 15/00; B23P 2700/14; B21D 53/88
USPC .................................... 280/124.13; 29/897.2
See application file for complete search history.

(56) References Cited

U.S. PATENT DOCUMENTS

| | | | |
|---|---|---|---|
| 2013/0140853 A1* | 6/2013 | Neumann | B62D 21/00 296/204 |
| 2017/0015169 A1* | 1/2017 | Riegelsberger | B60G 7/001 |
| 2017/0057313 A1* | 3/2017 | Paulsen | B33Y 10/00 |
| 2017/0253097 A1* | 9/2017 | Steiner | B60G 7/001 |

FOREIGN PATENT DOCUMENTS

| | | | | |
|---|---|---|---|---|
| DE | 102012006686 A1 | * | 10/2013 | ............ B21D 53/88 |
| JP | 2010254255 A | * | 11/2010 | |
| KR | 20130043344 A | * | 4/2013 | |

\* cited by examiner

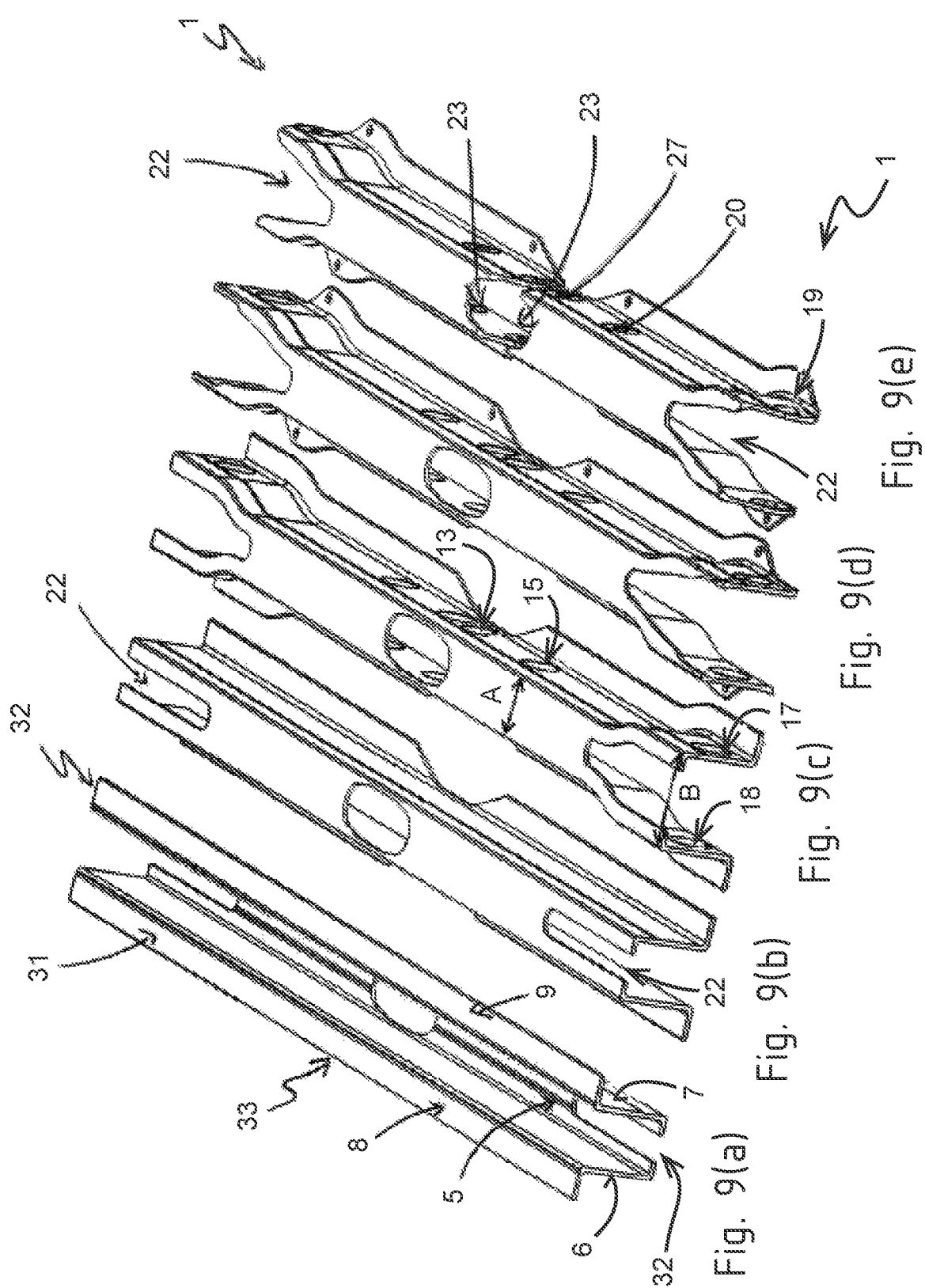

CONTROL ARM AND METHOD FOR PRODUCING A CONTROL ARM

CROSS REFERENCE TO RELATED APPLICATION

The present application claims priority to German Patent Application Number 10 2017 117 309.9 filed, Jul. 31, 2017, the disclosure of which is hereby incorporated by reference herein in its entirety.

BACKGROUND

1. Field of the Invention

The invention relates to a control arm and, more specifically, to a control arm made of an aluminum extrusion profile, and a method of manufacturing a control arm from an aluminum extrusion profile.

2. Description of the Related Art

In order to absorb the forces acting on a vehicle wheel, wheel suspensions in motor vehicles are equipped with springs and dampers, which are also often combined to form a spring-damper unit. These components are connected either directly to the wheel carrier or to a control arm that is designed to match. Such spring suspension arms connect the wheel carrier to an axle carrier or the vehicle body, where they are pivotably connected with their respective end regions.

From the prior art it is known to produce such control arms from steel or aluminum sheets. Thus, the document DE 197 37 715 A1 discloses a transverse control arm with a helical spring, in the center of which a damper is disposed.

When steel and aluminum sheets are used, the production of vehicle control arms takes more effort due to the necessary forming. In addition, the design options with respect to a thin and space-minimizing design of the control arm are limited. Moreover, control arms, constructed of sheets of steel, have the drawback of high weight.

SUMMARY

In accordance with one exemplary embodiment, a control arm is provided, which saves on weight, is optimized in terms of installation space and can be made in different shapes, and a method for the production thereof. The control arm is made of an aluminum extrusion profile with a first end section; a second end section and a middle section, which connects the first and second end sections and has a base; two side walls, which are angled substantially perpendicular therefrom and which are spaced apart from one another on the longitudinal side and have a height H; and flanges, which are angled substantially perpendicular from the side walls at their free end, wherein the first end section comprises a first connecting region; the second end section comprises a second connecting region; and the middle section comprises at least one third connecting region; wherein the side walls in the first connecting region and in the at least third connecting region have the same distance A; and the side walls in the second connecting region have a comparatively larger distance B.

A control arm in accordance with an exemplary embodiment may be made of an aluminum alloy of the 6000 or 7000 series. In particular, an aluminum material with the 6060 or 6082 specification is advantageous. With these high strength aluminum alloys it is possible to achieve a high rigidity at a relatively low weight.

This feature is supported by the embodiment with a base, two side walls, which are angled substantially perpendicular therefrom and which are spaced apart from one another on the longitudinal side and have a height H; and flanges, which are angled substantially perpendicular from the side walls at their free end. The result in this case is a hat-shaped profile in the cross section, with the hat-shaped profile being open upwards in the installed position, so that the requirements with respect to rigidity, buckling forces and fatigue strength can be satisfied in a simple way by the geometric design of the control arm. Consequently such a control arm is also easily scalable with respect to the load requirements in different types of cars.

The first connecting section is provided to connect the control arm to the wheel, whereas the second connecting region is provided to connect the control arm to the vehicle. The at least one third connecting region is used to connect a further component of a vehicle suspension, for example, a spring-damper combination, a spring-damper element, an anti-roll bar or a coupling rod. A spring-damper combination refers in this context to a spring and damper that are disposed separately from one another on the control arm, while a spring-damper element has integrated both components.

The embodiment of the control arm as an aluminum extrusion profile has, in particular, the advantage that it can be made particularly thin. The side walls of the underlying profile are produced with a distance A, which corresponds to the minimum required distance of the side walls of the finished control arm, in order to meet all of the load requirements. The profile can be widened, according to the specific requirements, at the points, where a large distance is needed. In the case of a component made of sheet metal, however, more exacting forming processes are needed, wherein the bending radii are usually limited in the downwards direction. On the whole, there are fewer shaping options. In the case of a control arm of the present invention, the degree, to which the material can be utilized, is high; and the control arm is optimized with respect to its weight and its cost.

At the same time the control arm is made in one piece and is trimmed and/or formed only afterwards, so that there is no need for joints made by welding or similar additional and cost intensive working steps.

In addition to an expansion in the second end section, it is also possible to provide, for example, an expansion in the middle section.

Furthermore, the profile may also have a curved contour.

The side walls in the connecting regions may be shifted locally to the inside by an amount M.

This measure makes it much easier to install the control arm of the present invention. In principle, such a control arm is first connected to the wheel carrier or, more specifically, the vehicle body with the first and second end section. The connection is usually carried out by means of rubber bearings or rubber-metal bearings, which are disposed between the side walls in the first and second connecting region and produce an articulated connection. The control arm is secured to the wheel carrier or vehicle body by bolting technology, so that when the control arm is installed, it is automatically clamped. When the screw is tightened, the side walls are moved towards one another. In addition, the inner sleeves of the rubber bearings may be outside the tolerances and may be too short. Both states lead to the situation that due to the tolerance the distance of the side walls in the area of the at least one third connecting region is smaller than provided for in the design. This means that a damper or a spring-damper unit can no longer be introduced into and mounted in the profile. Therefore, it is customary to widen the profile even in the area of the at least one third connecting region, in order to take into account such assembly tolerances. However, the net result is an at least local widening of the control arm, which then requires more installation space, and an additional process step is necessary, an aspect that increases the cost of production.

The solution to this problem is to make the distance A of the side walls of the extrusion profile larger during production than provided for in the design in the installed state. Then the side walls are shifted locally to the inside, for example, stamped or formed in some other way. This local displacement makes it possible to control and to adjust the distance of the side walls with precision. In this case the distance A may be selected in such a way that the tolerance variations during the production of the aluminum extrusion profile no longer have any impact.

The amount M of the local displacement in the at least one third connecting region may be smaller than the amount M of the local displacement in the first or second connecting region.

This means that the distance of the side walls at the local displacements in the first or second connecting region is less that at the local displacements in the at least one third connecting region. Consequently the production tolerances and the dimensional deviation arising during the installation of the control arm may be taken into account by the clamping of the control arm, as described above, without having to have the entire profile widened in certain regions. Instead, the same effect can be produced by the variably deep displacements. Even if during installation the side walls are moved further towards one another than intended, this can be taken into account by the different amounts M of the displacements, by selecting the amount of the displacement in the third connecting region in such a way that even in the event of extreme deviations in all tolerances there will still be sufficient space between the side walls to introduce a spring-damper or a spring-damper unit.

A further advantage of the local displacements is the fact that the side walls are aligned parallel to one another at the processed places; and, as a result, it is possible to compensate for deviations due to production or processing. Hence, defined contact surfaces for connecting elements, such as rubber bearing sleeves or screws, can be provided.

In an exemplary embodiment, the base in the second end section comprises a recess that extends in the longitudinal direction of the control arm. The longitudinal direction is defined in this context as the spatial direction, in which the control arm extends from its first end section to its second end section.

The recess makes it possible to widen the control arm in the second end section without causing, as a result, cracks in the material or other damages to the control arm that would be deleterious to its service life. By trimming the base the side walls of the control arm can be easily widened outwards without a plastic deformation of the material occurring.

The ratio of the distance B of the side walls to a length C of the recess may range from 0.2 to 0.8, preferably from 0.3 to 0.6, and more specifically from 0.4 to 0.5, in the second end section. Widening the second end section may cause plastic deformations, in particular, in a transition section, in which the original distance A of the side walls increases to the distance B of the side walls in the second end section. These plastic deformations may lead to damages over the service life of the control arm, so that the control arm fails and has to be replaced. Therefore, these plastic deformations should be avoided. So that the side walls in the second end section can be widened and displaced in such a way that there is no plastic deformation, the longest and deepest possible trimming of the base is necessary. At the same time the recess may not be too deep, so that the overall rigidity of the control arm is retained. The height of the side walls is preferably constant over the entire length of the control arm. This aspect can be achieved ideally by the embodiment as an aluminum extrusion profile and leads to a thin design of the control arm and, thus, to an optimization with respect to the installation space.

According to an exemplary embodiment, the aluminum extrusion profile has varying wall thicknesses over its cross section. This means that the base, the side walls and/or the flanges have wall thicknesses of different sizes, when viewed over the hat-shaped cross section of the profile. At the same time it is possible the wall thickness of the base, the side walls and/or the flanges itself varies. The wall thickness of the side walls tends to be greater than the wall thickness of the base and the flanges. This aspect is used, in particular, to optimize the weight of the control arm. The rigidity of the control arm depends, in particular, on the thickness of the side walls. Therefore, the wall thickness of the side walls can be designed for the respective load, whereas, for example, base and/or flanges can be designed thinner, since they do not contribute to the buckling resistance of the control arm. Therefore, owing to the different wall thicknesses the material of the control arm is processed in accordance with the load.

In addition, it is also possible to vary the wall thickness in certain sections in the longitudinal direction of the control arm, in order, for example, to enable an intended buckling behavior in the event of a crash or to make the connecting regions particularly stable.

Furthermore, a weight optimization is possible by introducing recesses into the base, the side walls and/or the flanges or by trimming the base, the side walls and/or the flanges.

The side walls in the first end section and in the middle section extend in a preferred manner parallel at a constant distance. This aspect leads to a cost effective way of producing the control arm, since the original extrusion profile can be designed for the final dimensions of the control arm. Then only the second end section is mechanically processed, i.e., widened, while the first end section and the middle section can be left unchanged. This arrangement makes possible a thin construction combined with low space and material requirement. Due to the fact that the side walls extend parallel to one another, an ideal contact surface for the rubber bearing sleeves or the screws and the like is made available. Even the introduction of the local displacements in the connecting regions is simplified, since only one stamping operation has to be carried out, wherein the force effect is perpendicular to the surface.

Another exemplary embodiment provides that in the second end section the middle section is followed by a transition section, in which the distance A of the side walls increases uniformly to a distance B. This embodiment of the control arm results in a uniform distribution of the forces, acting on the control arm under load, and the avoidance of stress peaks. This measure that is designed to reduce the stress on the material leads to a higher service life of the control arm.

The side walls may extend parallel at a constant distance B in the second end section after the transition section. The advantages of the parallel course of the side walls has already been discussed above. In particular, the second connecting regions is also in this part of the end section, where the side walls extend parallel to one another. Due to the fact that the side walls extend parallel to one another, an ideal contact surface is provided for the rubber bearing sleeves or the screws and the like. Even the introduction of the local displacements in the connecting regions is simplified, since only the stamping operation has to be carried out, wherein the force effect is perpendicular to the surface.

Furthermore, the connecting regions comprise preferably connecting devices. Basically they are elements that are formed on the control arm or are affixed thereto, in order to connect rubber bearings or rubber-metal bearings or a ball joint or the like to the control arm and to enable the control arm to be connected to the wheel carrier or the vehicle body. In this case, the connecting devices may be, in particular, breakthroughs that are introduced into the side walls so as to be aligned with one another. Then a rubber bearing may be arranged between the two side walls, so that the inner sleeve of the rubber bearing is arranged such that it is aligned with the breakthroughs, so that a screw may extend through the breakthroughs and the rubber bearing inner sleeve.

Similarly a spring-damper element may have, for example, recesses, which correspond to the connecting devices, so that the spring-damper element can be connected to the control arm by means of a screw.

The side walls at the connecting devices may be shifted to the inside. In this case it is provided, in particular, that the expansion of the locally displaced side walls correspond with a contact surface of a connecting element, for example, a rubber bearing or a screw. Consequently the local displacements are carried out only at those places of the side walls or the connecting regions, where they are necessary to produce a defined contact surface, in order to provide defined contact surfaces, against which screw heads or rubber bearing inner sleeves may abut. This means that the material of the control arm to be displaced is minimized, an aspect that in turn simplifies the production process.

Furthermore, it is provided that the connecting devices are formed at the same distance from the base in the longitudinal direction of the control arm. This means in other words that, when viewed in the longitudinal direction, all of the connecting devices are on the same level. As a result, ideal levers are produced to absorb and transfer in an optimal way the forces acting on the control arm.

The ratio of the distance E of the connecting devices of the first and third connecting region to a distance F of the connecting devices of the first and second connecting region ranges from 0.5 to 0.1, and more specifically, from 0.2 to 0.3. Depending on the configuration of the chassis and the axle load to be expected, the force transmission can be optimized in this way. Using the existing installation space the stroke path for the spring-damper element or the spring-damper combination can be maximized, so that the lowest possible forces act; and the lowest possible damping is necessary, an aspect that optimizes the overall design of the control arm.

Another exemplary embodiment of the invention embodies that an arch, arranged between a side wall and a flange, is provided with a bevel at least in certain regions. By introducing such a bevel a little more space is provided in the transverse direction at one of the upper edges between side wall and flange of the control arm, an aspect that improves the freedom of motion of the spring-damper element or the spring-damper combination, as a result of which the utilizability of the entire control arm in driving mode is improved.

Furthermore, an exemplary embodiment of the invention is embodied as a method for producing a control arm from an aluminum extrusion profile with following steps:
   providing an aluminum extrusion profile with a base; two side walls, which are angled substantially perpendicular therefrom; and flanges, which are angled substantially perpendicular from the side walls at their free end,
   mechanically processing the aluminum extrusion profile to form at least one connecting region,
   trimming the base in at least one profile end of the aluminum extrusion profile, so that a recess, extending in the longitudinal direction of the aluminum extrusion profile, is produced,
   widening the profile end,
   recutting at least in certain regions the edges of the first trimming after widening.

In particular, aluminum alloys of the 6000 and 7000 series are used in this case. It is, in particular, an aluminum alloy 6082. The aluminum extrusion alloy exhibits a hat profile with a base, two side walls, angled substantially perpendicular therefrom, and flanges, angled substantially perpendicular from the side walls on their free ends. The side walls are spaced apart from one another at a distance A and have a height H. This distance A is retained in a first end section and in a middle section of the subsequent control arm. The second end section, which was widened, exhibits a larger distance B between the side walls.

The mechanical processing for forming the at least one connecting region is not limited to just those method for machining and cutting, but may also include methods relating to forming technology.

In order to avoid plastic deformations during the widening process or to prevent potential cracks when widening, the base is trimmed in at least one profile end of the aluminum extrusion profile. This profile end yields the second end section of the subsequent control arm.

However, widening the profile end may result in the trimmed edges of the previous trimming of the base to suffer nicks or cracks. However, such defective places have the effect of shortening the service life, since in running mode such defective places may be the beginning of larger cracks, which in turn lead of the failure of the control arm. Therefore, after the widening operation the edges of the first trimming are recut at least in certain regions in order to obtain smooth and crack-free or nick-free cut edges. As a result, a more stable and fatigue resistant control arm can be produced in a simple way.

The base is trimmed preferably in such a way that a V-shaped or U-shaped recess is produced. With this measure it is also possible to avoid a plastic deformation of the material during the widening process. The V-shaped trimming is carried out in such a way that the recess at the end of the control arm has its largest expansion in the transverse direction and becomes narrower in the direction of the middle section of the control arm. In the case of a U-shaped trimming the trimmed edges extend parallel to the side walls. The recess in the direction of the center of the control arm tapers off in an approximately hemispherical trimming. This aspect ensures that the forces, acting on the side walls during the widening operation, do not lead to a plastic deformation of the material and do not result in cracks or excessive thinning of the material.

Furthermore, when the at least one connecting region is formed, the side walls be shifted locally to the inside by an amount M. This local displacement has advantages with respect to the later installation of the control arm into the vehicle.

Furthermore, connecting devices are formed preferably in the connecting regions. For example, it is possible to produce by mechanical process opposing, aligned breakthroughs, through which a screw extends later, in order to secure a rubber bearing between the side walls.

The connecting regions and the connecting devices may be formed at the same time or else in separate working steps.

Similarly the individual steps for trimming the control arm and the steps for mechanical processing may be carried out in any order of sequence.

A plurality of connecting regions may be formed, wherein the amount M of the local displacement in at least two connecting regions is designed so as to vary in size. Even in this case with respect to the inventive effect of the local displacements reference is made to the aforesaid. With respect to the production method it becomes clear here that the local displacements can be produced in an extremely simple way. This can be done, for example, before or after the widening operation or even at the same time with it.

The method provides that a bevel is formed at least in certain regions on an arch arranged between the side wall and a flange. This bevel may be produced, for example, by mean of mechanical forming, for example, a fresh stamping. The bevel may be produced before, after or simultaneously with the widening of the end section.

If the introduction of the local displacements and the bevel simultaneously with the widening of the end section is carried out in the same tool, then this leads to a particularly efficient production of the control arm, since several working steps can be integrated into a single operation.

An additional embodiment of the method of the present invention provides that the aluminum extrusion profile is solvent-annealed and quenched after its production and before further processing. In this way the extrusion profile is brought into a state that can be processed, wherein the further processing, such as trimming or widening, has to take place within a certain period of time after the quenching, so that the processability is not subject to the risk of hardening, which occurs naturally.

In addition, it is provided that the control arm is subjected to an aging process, in particular, artificial aging. The aging process results in the control arm being completely hardened and to its retaining a rigidity that is required for a long service life.

BRIEF DESCRIPTION OF THE DRAWINGS

For an understanding of embodiments of the disclosure, reference is now made to the following description taken in conjunction with the accompanying drawings, in which:

FIGS. 9a to 9e illustrate the process steps during the production of a control arm.

In the figures, the same reference signs are used for identical or similar component parts, even if a repeated description is omitted for reasons of simplification.

DETAILED DESCRIPTION OF SOME EMBODIMENTS

Some embodiments will be now described with reference to the Figures.

Figure 1:
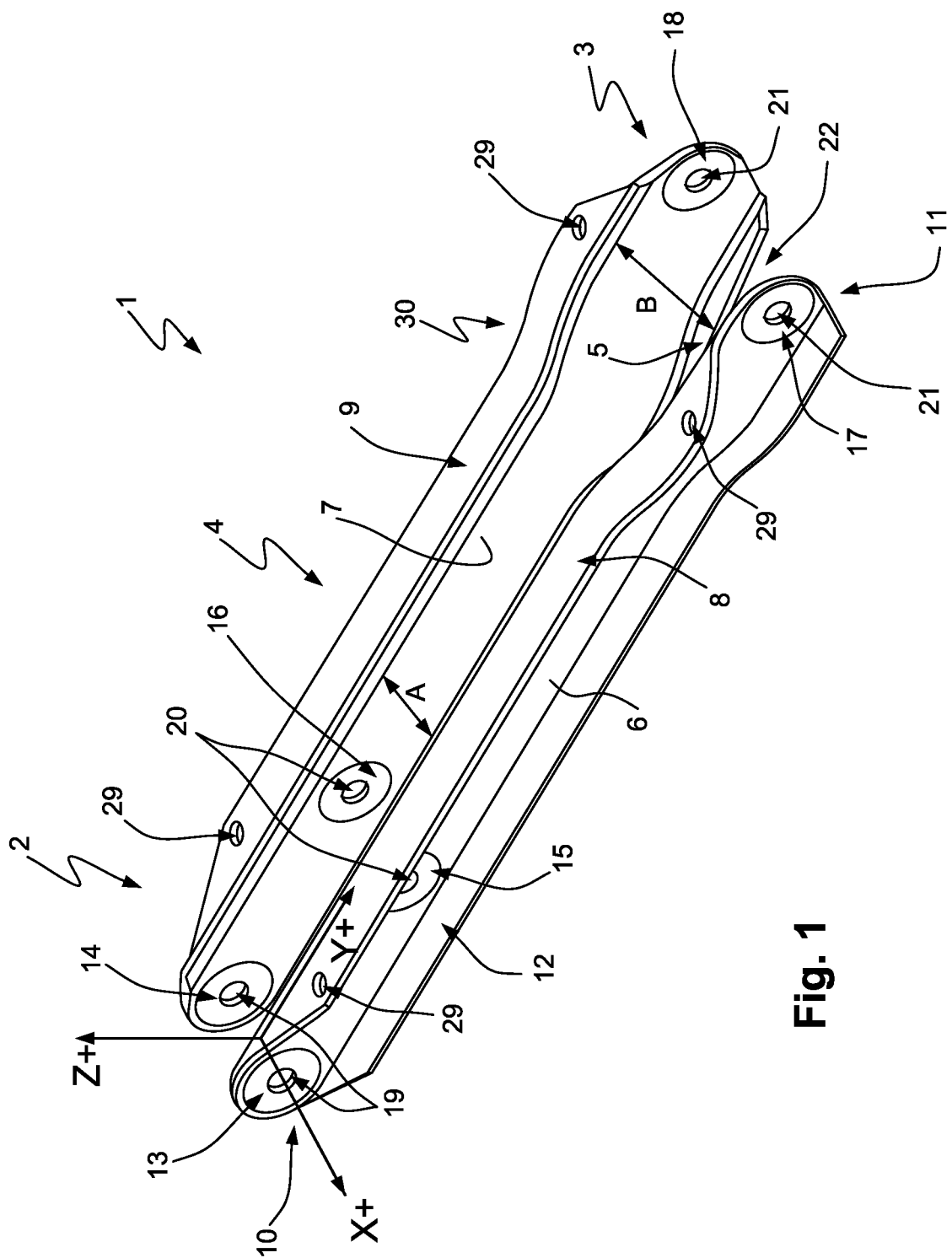
FIG. 1 is a perspective view of a control arm in an accordance with an exemplary embodiment.

FIG. 1 shows a control arm 1, which is produced from an aluminum extrusion profile. The control arm comprises a first end section 2, a second end section 3 and a middle section 4, which connects the first and second end sections. In addition, the control arm 1 comprises a base 5, two side walls 6, 7, which are substantially perpendicular to the base and which are spaced apart from one another on the longitudinal side and have a height H Flanges 8, 9 are substantially perpendicular and extend outwardly from the side walls 6, 7 at their free end. The first end section 2 comprises a first connecting region 10. The second end section 3 comprises a second connecting region 11. The middle section 4 comprises a third connecting region 12. The distance A of the side walls 6, 7 in the first connecting region 10 and in the third connecting region 12 is the same size. In contrast, the side walls 6, 7 in the second connecting region 11 exhibit a greater distance B.

The first connecting region 10 comprises a connecting device 19, which is formed by two breakthroughs, which are formed in the side walls 6, 7 so as to be aligned with one another. In this first connecting region 10 a rubber bearing, which is not shown in detail, can be used, wherein, for example, a screw extends through the breakthroughs of the connecting device 19 and a rubber bearing inner sleeve. In the first connecting region 10 the side walls 6, 7 are shifted locally to the inside around the breakthroughs of the connecting device 19. Displacements 13, 14 are formed there.

Even in the second connecting region 11 it is possible to use a rubber bearing (not shown in detail), which can also be held by a screw, wherein the screw extends through the rubber bearing inner sleeve and two breakthroughs, which form the connecting device 21 of the second connecting region 11. In the region of the breakthroughs in turn the displacements 17, 18 are formed.

Even in the third connecting region 12 there are breakthroughs, which form a connecting device 20. Here, for example, the connecting end of a spring-damper unit, which is not shown in detail, can be introduced and can be connected to the control arm 1 by bolting technology. Even in the third connecting region 12 the respective side wall 6, 7 is displaced locally to the inside, so that the displacements 15, 16 form.

Figure 2:
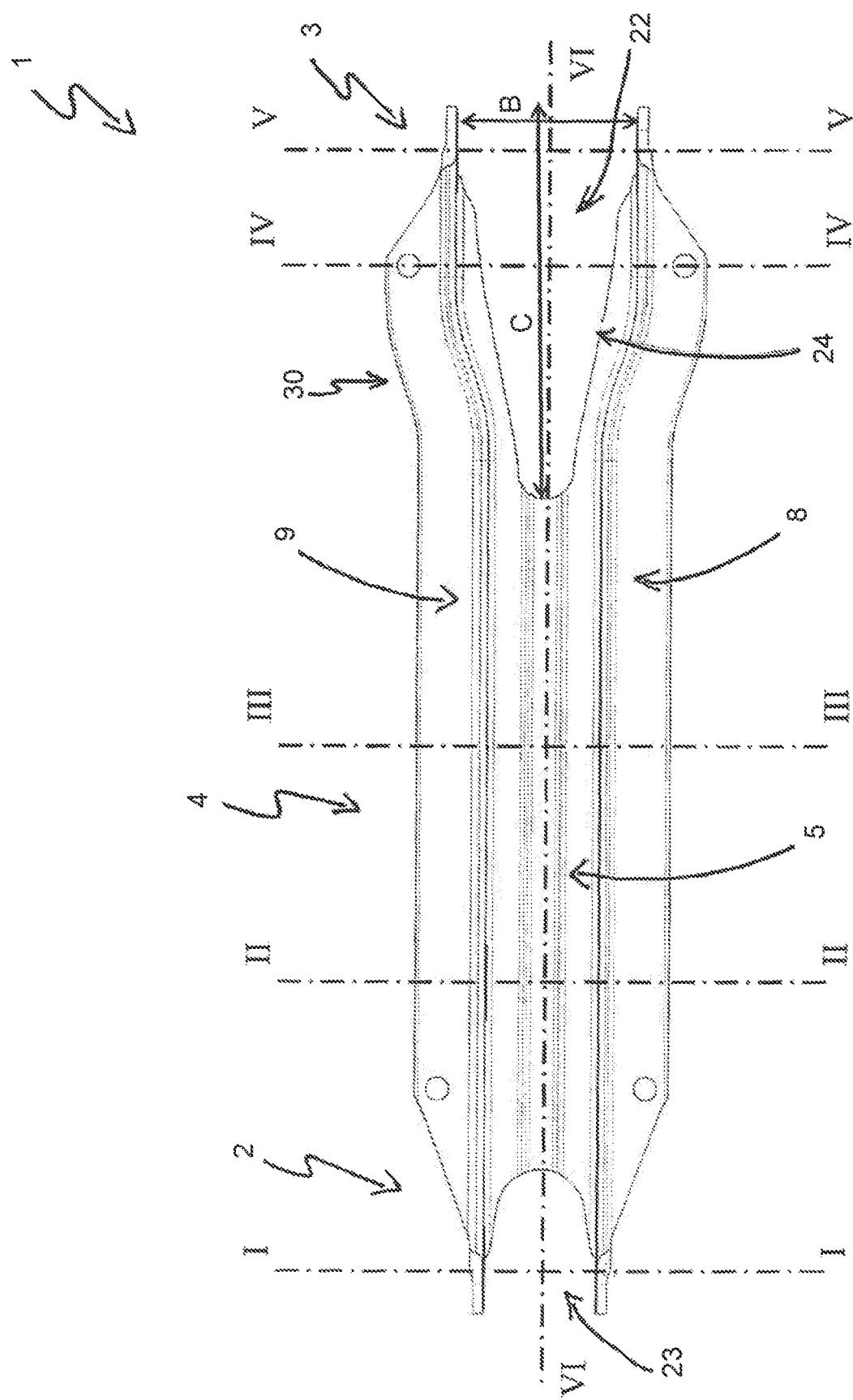
FIG. 2 is a plan view of the control arm of FIG. 1.

The plan view of FIG. 2 shows clearly the ratio of the individual dimensions of the control arm 1. It can be seen that the side walls 6, 7 in the first end section 2 and in the middle section 4 are spaced apart from one another at a distance A and run parallel to one another at a constant distant A in the first end section 2 and in the middle section 4. Not until in the second end section 3 does the distance in a transition section 30 increase steadily until finally the side walls 6, 7 extend again parallel to one another at a distance B.

A recess 22, which extends in the longitudinal direction of the control arm, can be seen in the second end section 3. The recess 22 has a length C. The recess 22 is more or less V shaped and tapers off in an arcuate shape in the direction of the center of the control arm. The recess 22 is produced by trimming the base 5 followed by widening the second end section 3.

The ratio of the distance B of the side walls to a length C of the recess ranges from 0.2 to 0.8, preferably from 0.3 to 0.6, more preferably from 0.4 to 0.5. In the exemplary embodiment shown, the ratio of B to C is 0.43.

Even in the first end section 2 the base 5 is locally trimmed, in order to produce a recess 23 of the first end section 2. This recess is used primarily for the freedom of motion of the control arm 1. The first end section 2 is arranged so as to be articulated on the wheel side and is moved continuously by the motion of wheel during compression or decompression. In order to retain the free motion of the control arm, it is necessary to form here a recess 23, approximately U-shaped in this embodiment. In contrast, the recess 22 in the second end section 3 also has the function of preventing a plastic deformation or cracks when the second end section 3 is widened.

Figure 3:
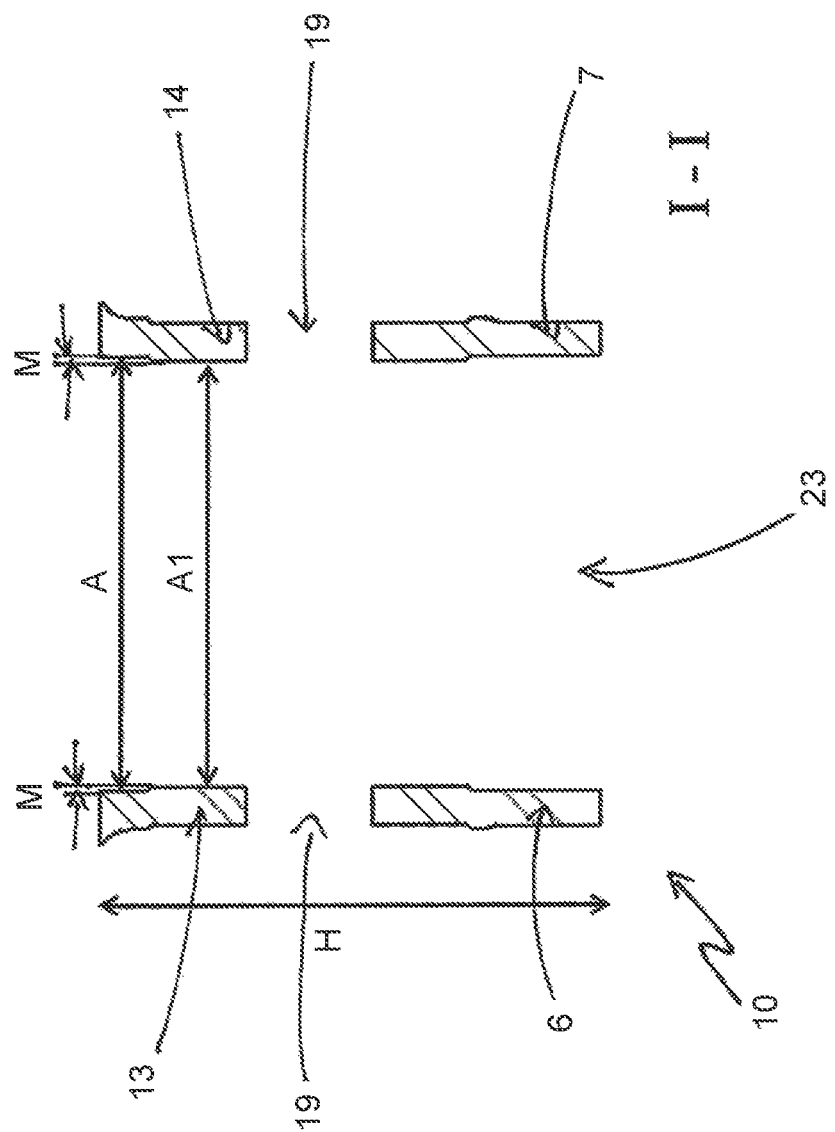
FIG. 3 is a cross-sectional view taken along line I-I in FIG. 2.
Figure 4:
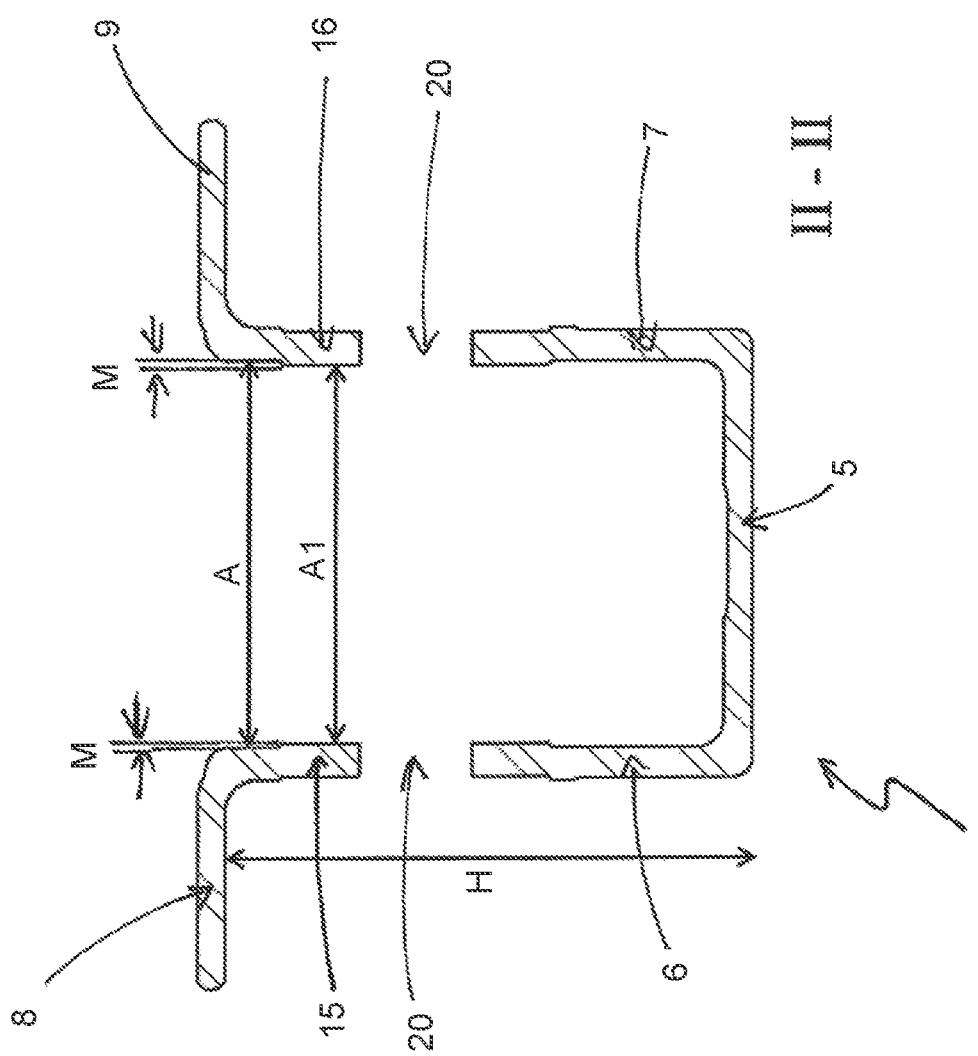
FIG. 4 is a cross-sectional view taken along line II-II in FIG. 2.

FIG. 3 shows a cross section of the control arm 1 in the area of the first connecting region 10. Here it can be seen that the side walls 6, 7, adjacent to the breakthroughs of the connecting device 19, are shifted to the inside by an amount M. The same applies to the cross sections shown in FIGS. 4 and 7, each of which shows the cross section of the control arm in the area of the third connecting region 12 or the second connecting region 3. Here, too, the side walls 6, 7 are shifted locally to the inside by an amount M. Thus, in the third connecting region 12 there are displacements 15, 16 in the area of the connecting device 20 for a spring-damper unit. Similarly in the second connecting region 11 there are identical displacements 17, 18 in the side walls 6, 7, adjacent to the connecting device 21 for the rubber bearings arranged on the vehicle body for the connection. The amount M of the local displacements 15, 16 in the third connecting region 12 is less than the amount M of the local displacements 13, 14 in the first connecting region 10. This means that the side walls 6, 7 in both the first connecting region 10 and the third connecting region 12 are spaced apart from one another at a constant distance A. However, the local displacements 13, 14 in the first connecting region 10 has a distance A1, while the local displacements 15, 16 in the third connecting region 12 has, as can be seen in FIG. 4, a distance A2. In this case it holds that A1 is less than A2.

The distance A in the first connecting region 10 and the third connecting region 12 is greater than the desired size, which is intended for the distance of the side walls 6, 7 in the installed state of the control arm 1. If at this point the control arm 1 is installed in the vehicle, it is connected first to the wheel in the first connecting region 10 and then connected to the vehicle body in the second connecting region 11. In this case the control arm is screwed to the respective wheel-sided and body-sided connecting regions by means of a rubber bearing and a screw, with the screw extending through the connecting devices 19, 21, which are designed as breakthroughs. The screw connection results in the side walls 6 and 7 being moved towards one another in the first end section 2 and the second end section 3. In the ideal case the distance A1 has now the intended desired size for the distance of the side walls 6, 7. Owing to the tolerance during production of the aluminum profile, due to the dimension of the rubber bearing inner sleeve or due to the installation, this distance A1 in the installed state may be smaller than the desired size of the distance of the side walls 6, 7. Since now the amount M of the local displacements 15, 16 in the third connecting region 12 is smaller than the amount M of the local displacements 13, 14 in the first connecting region 10, the distance A2 in the installed state of the control arm 1 is greater than the desired size of the distances of the side walls 6, 7 of the control arm 1 in the installed state. For this purpose all of the possible tolerances owing to construction and installation have to be maintained in the difference between the distances A1, A2 of the local displacements 13, 14, 15, 16 in the first connecting region 10 and the third connecting region 12. If this is ensured, then the distance A2 is always greater than the desired distance between the side walls 6, 7; and the spring-damper unit can be easily introduced and mounted in the control arm 1 in any event.

In addition, FIG. 3 shows that the base 5 of the original aluminum extrusion profile was completely removed at this location, in order to form a recess 23. Even the flanges 8, 9 of the aluminum extrusion profile were almost completely cut off at this location of the control arm 1 in the first end section 2.

The aluminum extrusion profile, underlying the control arm 1, has varying wall thicknesses over its cross section. This means that when viewed over the cross section of the profile, the base 5, the side walls 6, 7 and/or the flanges 8, 9 may have wall thicknesses of different sizes.

Figure 5:
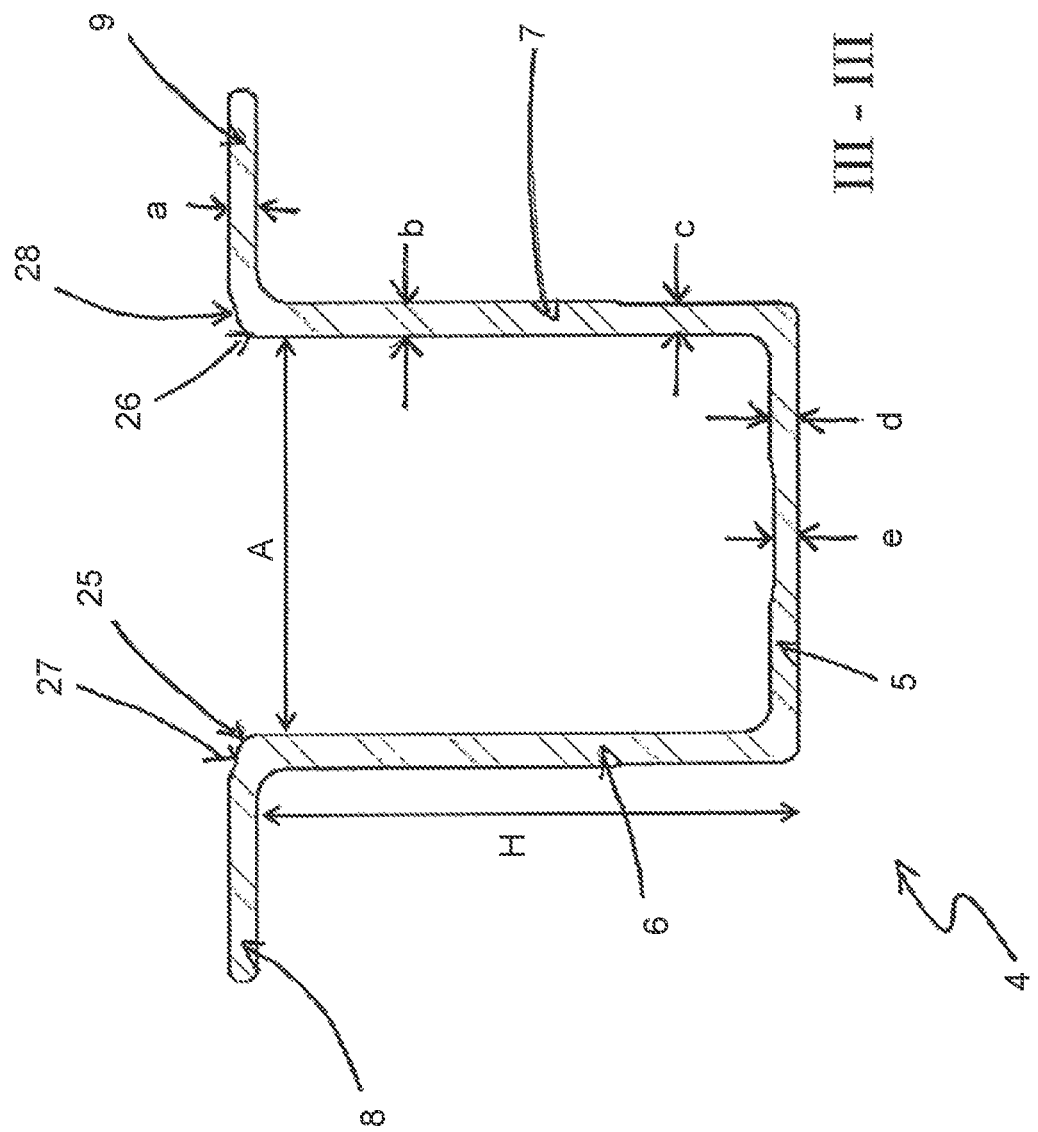
FIG. 5 is a cross-sectional view taken along line III-III in FIG. 2.

This is shown clearly in the cross section of the control arm 1 in the middle region 4 of the control arm 1, shown in FIG. 5. Here the flanges 8, 9 have a wall thickness a. The side walls 6, 7 have different wall thicknesses over the height H of the side walls 6, 7. The upper two thirds of the side walls 6, 7 have a first wall thickness b, whereas the lower third of the side walls 6, 7 is constructed with a second wall thickness c. In this case the first wall thickness b is greater than the second wall thickness c. Even the base 5 has locally different wall thicknesses. Thus, the partial surfaces of the base 5 that abut the side walls 6, 7 are provided with a first wall thickness d, while the central section of the base 5 has a second wall thickness e. It holds here that the first wall thickness d is greater than the second wall thickness e.

However, in this exemplary embodiment of the control arm 1 the configuration of the cross section is constant, when viewed in the longitudinal direction. This means that the wall thicknesses do not change over the length of the cross arm 1.

Between the flanges 8, 9 and the side walls 6, 7 there is in each case an arch 25, 26. In this section of the control arm 1 in the middle section 4, which is shown by the cross section shown in FIG. 5, the arches 25, 26 are provided in each case with a bevel 27, 28 respectively. These bevels make it possible to increase the cross section of the control arm 1 locally, in order to allow the spring-damper element a greater freedom of motion.

Figure 6:
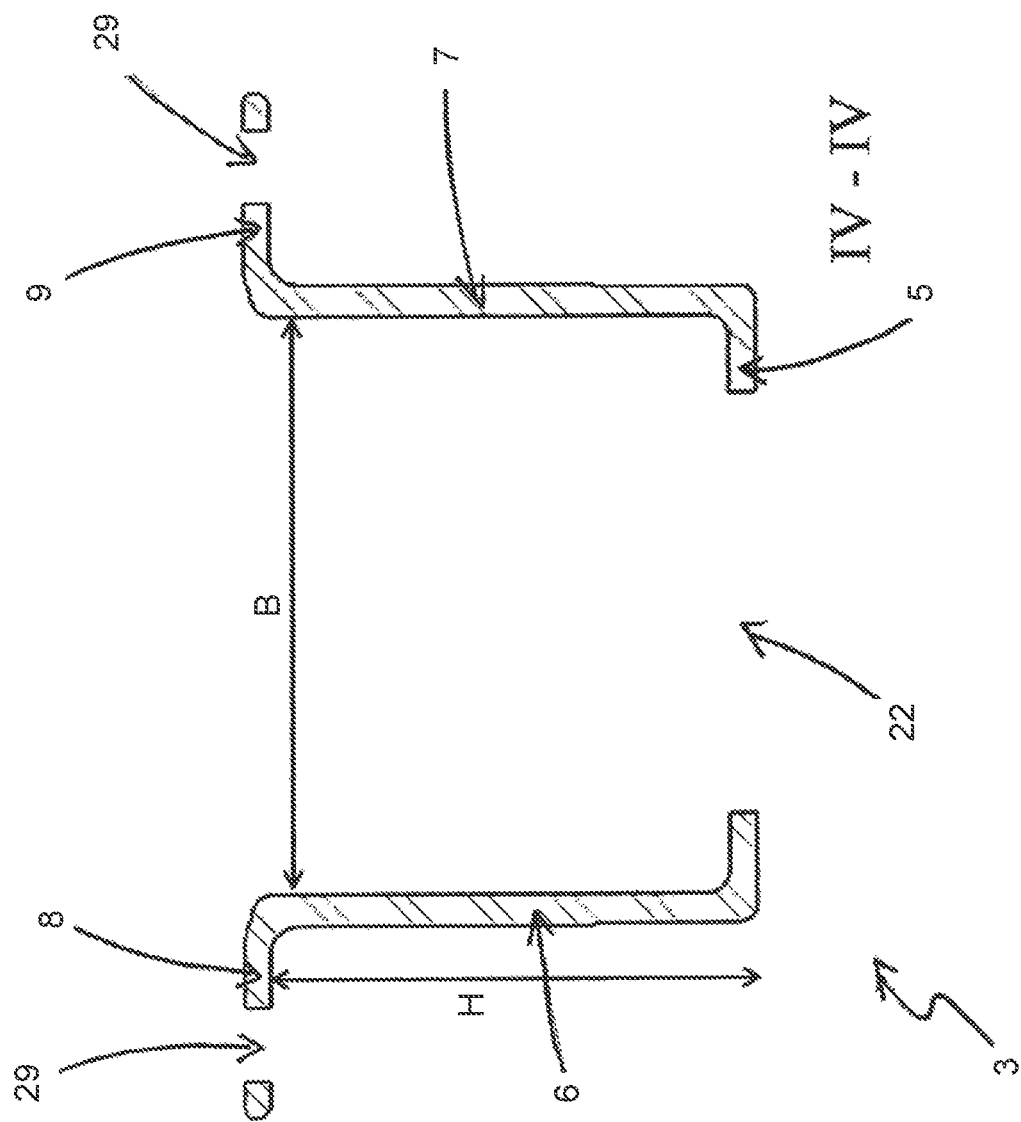
FIG. 6 is a cross-sectional view taken along line IV-IV in FIG. 2.
Figure 7:
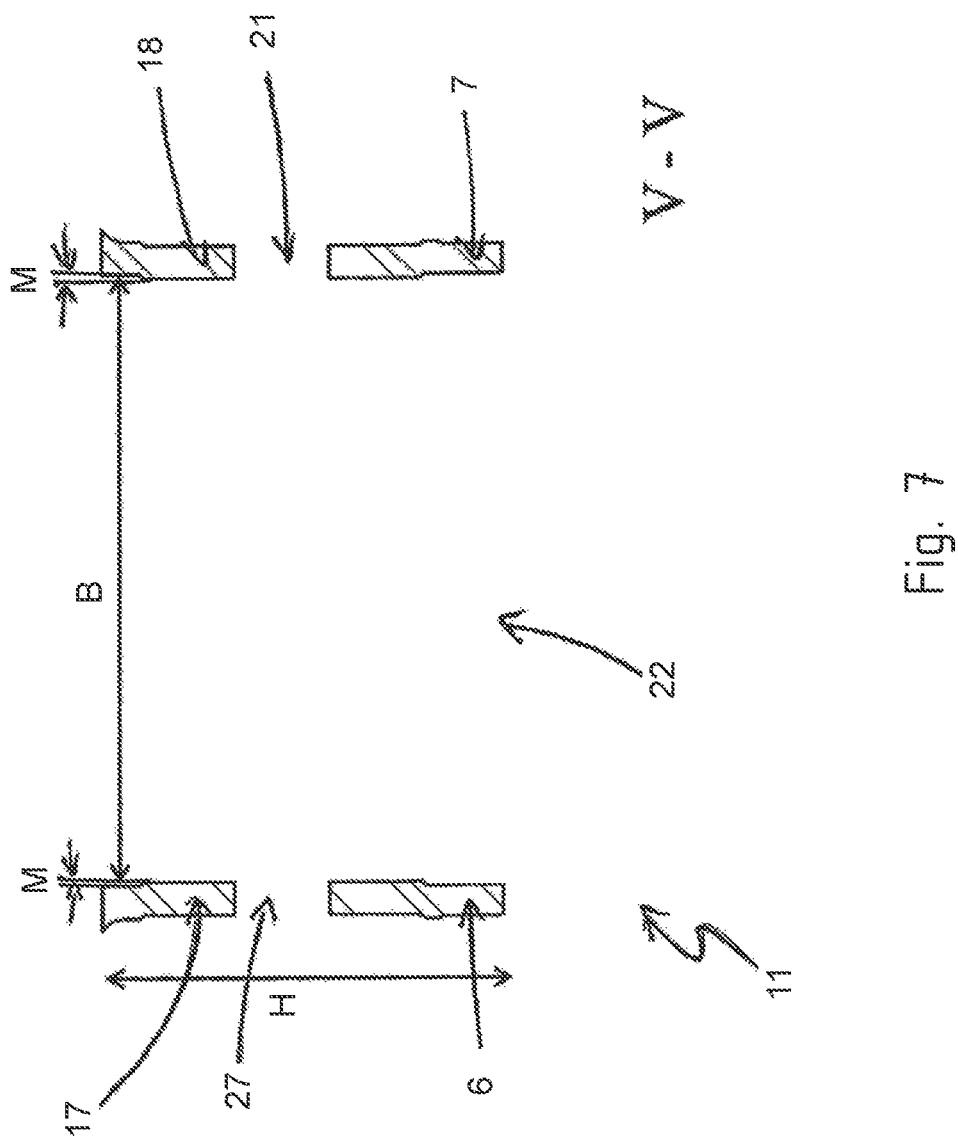
FIG. 7 is a cross-sectional view taken along line V-V in FIG. 2.

The embodiment of the second end section 3 of the control arm 1 is explained in greater detail by means of the cross sectional views in FIGS. 6 and 7. FIG. 6 shows a cross section of the profile of the control arm 1, adjacent to the second connecting region 3. The base 5 is not completely cut out at this point, but the flanges 8, 9 show openings 29. These opening 29 are used to attach a stone guard or a windshield, which is made preferably of plastic and can be clipped into the openings 29.

The cross section in FIG. 7 shows the second connecting region 11. There the side walls 6, 7 in turn are shifted locally to the inside by an amount M, so that the displacements 17, 18 form. The local displacements 17, 18 are adjacent to the breakthroughs, which are also present here, of the connecting device 21, to which a rubber bearing is secured by bolting technology. In this cross sectional view it can also be seen that the recess 22, which is introduced in the base 5, extends here over the complete width of the profile. Hence, the base 5 has been completely removed. In contrast, the recess 22, shown in FIG. 6, does not extend completely between the side walls 6, 7, but rather only a part of the base 5 has been cut out.

Figure 8:
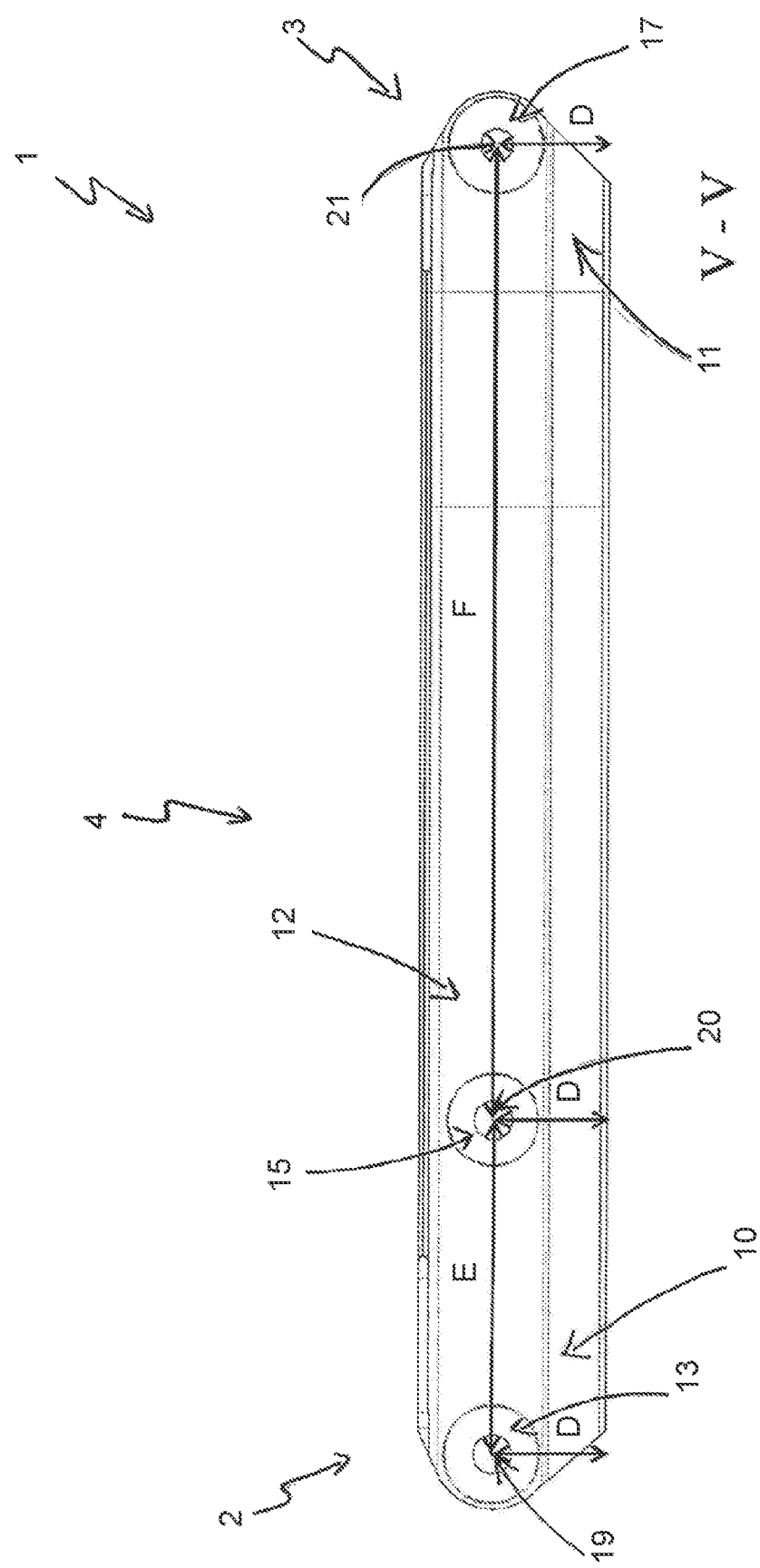
FIG. 8 is a cross-sectional view taken along VI-VI in FIG. 2.

FIG. 8 shows a longitudinal view of the control arm 1. Here it can be seen that the connecting devices 19, 20, 21 of the first, third and second connecting region 10, 12, 11 are formed at the same distance D from the base, hence, are on the same level.

The connecting devices 19, 20 of the first connecting region 10 and the third connecting region 12, have a distance E, whereas the connecting device 20 and the connecting device 21 of the third connecting region 12 or the second connecting region 11 have a distance F. The ratio of the distance E to the distance F is 0.5 to 0.1, preferably 0.2 to 0.3. In the illustrated exemplary embodiment the ratio is 0.25.

FIGS. 9a to 9e show individual process steps of the method for producing a control arm from an aluminum extrusion profile 31. In this case an aluminum extrusion profile 31 is provided first with a base 5, two sides walls 6, 7, angled substantially perpendicular therefrom, and flanges 8, 9, angled substantially perpendicular from the side walls 6, 7 on their free end.

The side walls 6, 7 are spaced apart from each other at a distance A and have a height H.

In this case an aluminum block is heated; and an aluminum profile of the invention is extruded. This extrudate is cut to length to form individual extrusion profiles 31. Prior to further processing, the profiles 31 are solvent-annealed and quenched. In this way the aluminum extrusion profiles 31 are brought into a state that can be processed, wherein the further processing, such as the trimming or widening, has to take place within a certain period of time after quenching, so that the processability is not subject to the risk of hardening, which occurs naturally.

In this exemplary embodiment the aluminum extrusion profile 31 is dimensioned in such a way that two control arms 1 can be made simultaneously from the aluminum extrusion profile. Each half of the aluminum extrusion profile 31 is processed to form a control arm 1, wherein the two halves of the aluminum extrusion profile 31 are processed to some extent symmetrically.

The aluminum extrusion profile 31 has two profile ends 32, from which a second end section 3 of a control arm 1 is formed in the next phase of the production process. The first end section 2 of a respective control arm 1 is formed in the profile center 33. At the end of the production process the two control arms 1 are separated from one another.

In a first process step, according to FIG. 9a, the base 5 is trimmed first, so that recesses 22, 23 are formed in the later end sections 2, 3 of the control arm 1. A recess 22, which extends in the longitudinal direction of the control arm 1, is formed, in particular, in the second end section 3. The cross sectional direction extends here parallel to the plane of the side walls 6, 7.

In a second processing step, according to FIG. 9b, the flanges 8, 9 are trimmed in the area of the later first end sections 2 of the control arm 1.

In the next process step, which is shown in FIG. 9c, the later second end sections 3 of the control arm 1 are widened. The side walls 6, 7 are shifted away from one another, so that the side walls 6, 7 have there in certain regions a distance B, which is greater than the distance A of the side walls 6, 7 in the other regions of the control arm 1. This is facilitated by the recess 23, which is present there in the base 5, so that plastic deformation, nicks and cracks are avoided.

Simultaneously with the widening the side walls 6, 7 in the later connecting regions 10, 11, 12 of the control arm 1 are shifted locally to the inside by an amount M. This takes place by means of a stamping operation.

In the next processing step (FIG. 9d) openings 29 are introduced into the flanges. In addition, the edges of the recess 23 are recut in certain regions of the ends of the aluminum extrusion profile 31. On the one hand, this feature produces smooth trimmed edges 24, in the event that nicks or cracks occurred in these furthest displaced sections of the side walls 6, 7. This feature is used to extend the service life of the control arm 1. At the same time the remains of the base 5 that are present at this location are removed in this way, in order to make possible the end section of the second end sections 3 perpendicular to the plane of the side walls 6, 7, as shown in FIG. 9e.

A final trimming of the respective end sections 2, 3 of the control arm perpendicular to the plane of the side walls 6, 7 follows as the last process step. In this case aluminum material around the displacements 13, 14, 17, 18 of the first and second end sections 2, 3 of the two control arms 1 is removed. This reduces, on the one hand, the weight, because excess material is cut away. On the other hand, the two control arms 1 in the region of the respective first end sections 2 are separated from one another in this way.

At the same time the connecting devices 19, 20, 21, which are designed as breakthroughs, are introduced into the side walls.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

REFERENCE NUMERALS AND SYMBOLS 1 control arm
2 first end section
3 second end section
4 middle section
5 base
6 side wall
7 side wall
8 flange
9 flange
10 first connecting region
11 second connecting region
12 third connecting region
13 displacement
14 displacement
15 displacement 16 displacement
17 displacement
18 displacement
19 connecting device
20 connecting device
21 connecting device
22 recess
23 recess
24 trimmed edge
25 arch
26 arch
27 bevel
28 bevel
29 opening
30 transition section
31 aluminum extrusion profile
32 profile end
33 profile center
A distance of 6, 7
A1 distance of 13, 14
A2 distance of 15, 16
B distance of 6, 7
C length of 22
D height
E distance of 19, 22
F distance of 19, 21
H height of 6, 7
a wall thickness of 8, 9
b first wall thickness of 6, 7
c second wall thickness of 6, 7
d first wall thickness of 5
e second wall thickness of 5

The invention claimed is:

1. A control arm made of an aluminum extrusion profile, comprising:
    a first end section,
    a second end section,
    a middle section, wherein the middle section connects the first and second end sections,
    a base, and two side walls spaced apart from one another in a longitudinal direction and extending substantially perpendicular from the base, with a height H, and flanges, which are angled substantially perpendicular from the side walls at their free end,
    wherein the first end section further comprises a first connecting region, the second end section further comprises a second connecting region, and the middle section further comprises at least one third connecting region,
    wherein the side walls in the first connecting region and in the at least one third connecting region have the same distance A; and the side walls in the second connecting region have a comparatively larger distance B.

2. The control arm according to claim 1, wherein the side walls in the first, second, and third connecting regions are shifted locally to the inside by an amount M.

3. The control arm according to claim 2, wherein the amount M of the local displacement in the at least one third connecting region is smaller than the amount M of the local displacement in the first or second connecting region.

4. The control arm according to claim 1, wherein the base in the second end section comprises a recess extending in the longitudinal direction of the control arm.

5. The control arm according to claim 4, wherein in the second end section the ratio of the distance B of the side wall to a length C of the recess ranges from 0.2 to 0.8.

6. The control arm according to claim 5, wherein the aluminum extrusion profile has wall thicknesses that vary over its cross section.

7. The control arm according to claim 6, wherein the side walls extend parallel at a constant distance in the first end section and in the middle section.

8. The control arm, according to claim 7, wherein in the second end section the middle section is followed by a transition section, and wherein the distance A of the side wall increases uniformly to a distance B.

9. The control arm according to claim 8, wherein in the second end section after the transition section, the side walls extend parallel at a constant distance B.

10. The control arm according to claim 9, wherein the first, second, and third connecting regions each comprises a connecting device.

11. The control arm according to claim 10, wherein the side walls at the connecting devices are shifted to the inside.

12. The control arm according to claim 11, wherein the connecting devices are formed at the same distance D from the base.

13. The control arm according to claim 12, wherein the ratio of the distance E of the connecting devices of the first and third connecting region to a distance F of the connecting devices of the first and second connecting region ranges from 0.5 to 0.1.

14. The control arm according to claim 13, further comprising an arch, arranged between a side wall and a flange, and wherein the arch is provided with a bevel at least in certain regions.

* * * * *